(12) United States Patent
Wang et al.

(10) Patent No.: US 7,826,531 B2
(45) Date of Patent: Nov. 2, 2010

(54) INDICATING REGIONS WITHIN A PICTURE

(75) Inventors: Ye-Kui Wang, Tampere (FI); Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 1160 days.

(21) Appl. No.: 11/335,107

(22) Filed: Jan. 19, 2006

(65) Prior Publication Data

US 2006/0115001 A1  Jun. 1, 2006

Related U.S. Application Data

(63) Continuation of application No. 10/424,618, filed on Apr. 28, 2003, now Pat. No. 7,302,001.

(30) Foreign Application Priority Data

Apr. 29, 2002  (FI)  .................................. 20020810

(51) Int. Cl.
  *H04N 7/12* (2006.01)
  *G06K 9/36* (2006.01)
(52) U.S. Cl. .................................. 375/240.1; 382/243
(58) Field of Classification Search ............ 375/240.24, 375/240.14, 240.01, 240.1; 382/232, 243
  See application file for complete search history.

(56) References Cited

U.S. PATENT DOCUMENTS

| | | | |
|---|---|---|---|
| 5,568,200 A | 10/1996 | Pearlstein et al. | |
| 5,778,143 A | 7/1998 | Boyce | |
| 5,815,601 A * | 9/1998 | Katata et al. | ................. 382/232 |
| 5,926,572 A | 7/1999 | Kim et al. | |
| 5,978,515 A | 11/1999 | Katata et al. | |
| 6,236,680 B1 * | 5/2001 | Chun et al. | ............ 375/240.01 |
| 6,301,301 B1 * | 10/2001 | Isu et al. | ................. 375/240.14 |
| 6,304,295 B1 | 10/2001 | Krishnamurthy et al. | |
| 6,516,095 B1 * | 2/2003 | Kadono | ..................... 382/243 |
| 6,873,740 B1 | 3/2005 | Devillers et al. | |
| 6,987,805 B1 | 1/2006 | Weckel et al. | |

OTHER PUBLICATIONS

Fall 2001, Aravind Sundaresan and Vikas Chandrakant Raykar, "Video Codec Implementation, DC Image Extraction and Shot Segmentation," ENEE 631, pp. 1-8.

Oct. 4-7, 1998, Min Wu, Wayne Wolf, and Bede Liu, "An Algorithm for Wipe Detection," Image Processing Proceedings 1998, International Conference, pp. 893-897.

(Continued)

*Primary Examiner*—Gims S Philippe
(74) *Attorney, Agent, or Firm*—Hollingsworth & Funk, LLC

(57) ABSTRACT

A method for indicating size, shape and location of a region within a digital picture the picture being divided into a set of blocks. A value for at least one size parameter, which is indicative of a number of the blocks within said region is defined, and a value for at least one shape evolution parameter, which is indicative of a selection order of the blocks in said region is selected. Then preferably the values for said at least one size parameter and said at least one shape evolution parameter are encoded into a bitstream of a video sequence in order to indicate size, shape and location of the region within the picture.

23 Claims, 3 Drawing Sheets

OTHER PUBLICATIONS

Jun. 24-28, 2002, Miska M. Hannuksela, Ye-Kui Wang, and Moncef Gabbouj, "Sub-Picture: ROI Coding and Unequal Error Protection," Image Processing Proceedings 2002, Internatioal Conference, pp. 537-540.

1997, Stephen Wenger, "Video Redundancy Coding in H.2.63+,", 6 pages.

Nov. 1998, Stephan Wenger, Gerd Knorr, Jörg Ott, and Faouzi Kossentini, "Error Resilience Support in H.2.63+," IEEE Transaction On Circuits and Systems for Video Technology, vol. 8(7), pp. 867-877.

Apr. 2002, Joint Video Team of ISO/IEC MPEG and ITU-T VCEG, *Working Draft No. 2, Release 7*, Geneva, Switzerland, Jan. 29-Feb. 1, 2002 (generated Apr. 11, 2002), pp. i-110.

Dec. 2001, ITU- Telecommunications Standardization Sector, *New Image Segmentation Method (VCEG-O-46r1)*, 15th Meeting: Pattaya Thailand Dec. 3-7, 2001 (generated Nov. 28, 2001, modified Jan. 7, 2002), 17 pages.

Sep. 2001, ITU- Telecommunications Standardization Sector, *H.26L over IP Framework: Proposed H.26L normative text (VCEG-N72r1)*, 14th Meeting: Santa Barbara, CA Sep. 21-24, 2001 (generated Sep. 26, 2001), 6 pages.

Jan. 2002, Joint Video Team of ISO/IEC MPEG and ITU-T VCEG, *Results of the Core Experiment for Sub-Picture Coding, 2nd Meeting Report*, Jan. 29-Feb. 1, 2002), Geneva, Switzerland, pp. 1-20 (generated Jan. 23, 2002).

Sep. 2001, ITU- Telecommunications Standardization Sector, *H.26L over IP and H.324 Framework (VCEG-N52)*, 14th Meeting: Santa Barbara, CA Sep. 21-24, 2001 (generated Sep. 18, 2001), pp. 1-14.

Feb. 2002, Joint Video Team of ISO/IEC MPEG and ITU-T VCEG, *JVT (of ISO/IEC MPEG and ITU-T Q.6/16 VCEG) 2nd Meeting Report*, Jan. 29-Feb. 1, 2002), Geneva, Switzerland, Jan. 29-Feb. 1, 2002), pp. 1-51.

Jan. 2002, ITU- Telecommunications Standardization Sector, *Core Experiment Description of Sub-Picture Coding (VCEG-O-O571)*, 15th Meeting: Pattaya Thailand Dec. 3-7, 2001 (generated Jan. 16, 2002).

Fukunaga et al., "Error Resilient Video Coding by Dynamic Replacing of Reference Points", IEEE, 1996, pp. 1503-1508.

Office Action dated Mar. 16, 2010 from parallel European Application No. 03722629.7, 5 pages.

Translated Notice of Allowance dated Apr. 30, 2010 from related KR Patent Application No. 10-2006-7008825, 3 pages.

\* cited by examiner

INDICATING REGIONS WITHIN A PICTURE

RELATED PATENT DOCUMENTS

This application is a continuation of U.S. patent application Ser. No. 10/424,618 filed on Apr. 28, 2003 now U.S. Pat. No. 7,302,001 which is incorporated herein by reference in its entirety.

FIELD OF THE INVENTION

The invention relates to video coding, particularly to indicating regions within a picture.

BACKGROUND OF THE INVENTION

Video files are composed of a plurality of still image frames, which are shown rapidly in succession as a video sequence (typically 15 to 30 frames per second) to create an idea of a moving image. Image frames typically comprise a plurality of stationary background objects defined by image information that remains substantially the same, and few moving objects defined by image information that changes somewhat. In such a case, the image information comprised by the image frames to be shown in succession is typically very similar, i.e. consecutive image frames comprise much redundancy. More particularly, the redundancy comprised by video files is dividable into spatial, temporal and spectral redundancy. Spatial redundancy represents the mutual correlation between adjacent image pixels; temporal redundancy represents the change in given image objects in following frames, and spectral redundancy the correlation between different colour components within one image frame.

Several video coding methods utilize the above-described temporal redundancy of consecutive image frames. In this case, so-called motion-compensated temporal prediction is used, wherein the contents of some (typically most) image frames in a video sequence are predicted from the other frames in the sequence by tracking the changes in given objects or areas in the image frames between consecutive image frames. A video sequence comprises compressed image frames, whose image information is determined without using motion-compensated temporal prediction. Such frames are called INTRA or I frames. Similarly, motion-compensated image frames comprised by a video sequence and predicted from previous image frames are called INTER or P frames (Predicted). Typically, at least one I frame and possibly one or more previously coded P frames are used in the determination of the image information of P frames. If a frame is lost, frames depending thereon can no longer be correctly decoded.

For example, JVT is a video coding standard that utilizes motion-compensated temporal prediction. JVT is the current project of the joint video team (JVT) of ISO/IEC Motion Picture Experts Group (MPEG) and ITU-T (International Telecommunications Union, Telecommunications Standardization Sector) Video Coding Experts Group (VCEG). It is inherited from H.26L, a project of the ITU-T VCEG.

In JVT/H.26L, images are coded using luminance and two colour difference (chrominance) components (Y, CB and CR). The chrominance components are each sampled at half resolution along both co-ordinate axes compared to the luminance component.

Each coded image, as well as the corresponding coded bit stream, is arranged in a hierarchical structure with four layers being, from top to bottom, a picture layer, a picture segment layer, a macroblock (MB) layer and a block layer. The picture segment layer can be either a group of blocks layer or a slice layer.

Data for each slice consists of a slice header followed by data for macroblocks (MBs). The slices define regions within a coded image. Each region is a number of MBs in a normal scanning order. There are no prediction dependencies across slice boundaries within the same coded image. However, temporal prediction can generally cross slice boundaries. Slices can be decoded independently from the rest of the image data. Consequently, slices improve error resilience in packet-lossy networks.

Each slice is divided into MBs. An MB relates to 16×16 pixels of luminance data and the spatially corresponding 8×8 pixels of chrominance data.

In the JVT/H.26L, a Video Coding Layer (VCL), which provides the core high-compression representation of the video picture content, and a Network Adaptation Layer (NAL), which packages that representation for delivery over a particular type of network, have been conceptually separated. The JVT/H.26L video coder is based on block-based motion-compensated hybrid transform coding. As with prior standards, only the decoding process is precisely specified to enable interoperability, while the processes for capturing, pre-processing, encoding, post-processing, and rendering are all left out of scope to allow flexibility in implementations. However, JVT/H.26L contains a number of new features that enable it to achieve a significant improvement in coding efficiency relative to prior standard designs.

JVT/H.26L is capable of utilizing a recently developed method called reference picture selection. Reference picture selection is a coding technique where the reference picture for motion compensation can be selected among multiple pictures stored in the reference picture buffer. Reference picture selection in JVT/H.26L allows selection of reference picture per macroblock. Reference picture selection can be used to improve compression efficiency and error resiliency.

Because of the motion compensation technique used in video coding, random access points have to be encoded in the video sequence to allow scanning of the video from an arbitrary point. Depending on the application used to scan the video sequence, a desirable time span between random access points in a video stream would be an order of 0,5-10 seconds. Coding of an intra frame has been a conventional solution for coding of random access points. However, as the above-mentioned reference picture selection technique allows referencing to frames prior to an intra frame, an intra frame as such is not a sufficient condition for a random access point. Furthermore, encoding of frequent intra frames in the video sequence requires more codec processing capacity and consumes more bandwidth.

Gradual decoder refresh refers to "dirty" random access, where previously coded but possibly non-received data is referred to and correct picture content is recovered gradually in more than one coded picture. In general, the gradual recovering of picture content provided by the gradual decoder refresh random access method is considered a desirable feature in JVT/H.26L video coding. The basic idea of the gradual decoder refresh is to encode a part of the macroblocks of the frames as intra-coded. When the decoder starts decoding at a random point, reference frames for motion compensation are unknown to the decoder, and they are initialised to mid-level grey, for example. The decoder can reconstruct intra-coded macroblocks, but inter-coded macroblocks referring to unknown areas in the motion compensation process cannot be reconstructed correctly. As the cumulative number of intra-coded macroblocks increases gradually frame by frame, a complete reconstructed picture may finally be obtained. However, this implementation involves several problems.

Due to reference picture selection, a macroblock in the reference frame may be referred to in the motion compensation process, which resides outside the region of reliably decodable intra-coded macroblocks.

In the JVT/H.26L, loop filtering is applied across each 4×4 block boundary to fade out abrupt borderlines. Thus, reliable areas may be affected by incorrectly reconstructed pixels in neighbouring macroblocks.

In the motion compensation process, referred non-integer pixel positions are interpolated from pixel values using multi-tap filter(s). In the current JVT codec design, half-pixel positions are interpolated using a six-tap filter. Thus, incorrectly reconstructed pixels may be used to interpolate a referred non-integer pixel position residing inside but close to the border of the reliably decodable area.

When the decoder starts the decoding of the frames, it assumes all intra-coded macroblocks to be reliable. However, all the aforementioned processes have the effect that the grey image information of the neighbouring macroblocks will intermingle with the reliably decodable image information of the intra-coded macroblocks. This causes an error that will propagate spatio-temporally when the decoding progresses from a frame to another.

A further problem in the process of gradual decoder refresh relates to poor coding efficiency, when indicating the macroblocks belonging to the initial region and the shape and the growth rate of the region. The information needs to be indicated to the decoder, which always causes some overhead bits to be included in the bitstream of the video sequence, the amount of overhead bits typically increasing significantly, if all the above-mentioned constraints are signaled separately. Accordingly, there is a need for a more efficient method for indicating the pattern how the region is evolving to the decoder.

BRIEF DESCRIPTION OF THE INVENTION

Now there is invented an improved method and an apparatus for implementing the method, which alleviate the problem of poor coding efficiency. Various aspects of the invention include a method, an encoder, a decoder, computer software products and a video signal, that are characterized in what is disclosed in the independent claims.

Various embodiments of the invention are disclosed in the dependent claims.

The invention is based on indicating size, shape and location of a region within a digital picture, which picture is divided into a set of blocks. A value for at least one size parameter, which is indicative of a number of the blocks within said region is first defined, and then a value for at least one shape evolution parameter, which is indicative of a selection order of the blocks in said region is selected.

According to an embodiment, the values for said at least one size parameter and said at least one shape evolution parameter are encoded into a bitstream of a video sequence in order to indicate size, shape and location of the region within the picture.

According to an embodiment, the value for said at least one shape evolution parameter is included in a parameter set of said picture.

According to an embodiment, said at least one size parameter comprises a size change rate parameter and a sequence number parameter of size change.

According to an embodiment, the number of the coding blocks within said region is determined on the basis of at least one of the following: the value for said size change rate parameter, the value for said change cycle parameter.

According to an embodiment, the value for said size change rate parameter is included in the parameter set of said picture, and the value for said sequence number parameter of size change is included in a slice header belonging to said region.

The invention provides several advantages. The mechanism can be used to provide random access points in coded video stream while simultaneously indicating a part of picture area, which can be reliably updated without full intra macroblock coverage of the area. A further advantage of the invention is that it improves the coding efficiency of the pattern indications for evolving regions. A yet further advantage is that the invention enables a simple way to prevent decoding across the borders of the reliably decodable area or from areas outside the reliably decodable area. Furthermore, the method is applicable, besides in video sequences, also in digital still pictures.

BRIEF DESCRIPTION OF THE FIGURES

In the following, the invention will be described in detail in connection with preferred embodiments with reference to the accompanying drawings, in which.

DETAILED DESCRIPTION OF THE INVENTION

The invention is applicable to all video coding methods using region-based motion-compensated temporal prediction. The invention is particularly applicable to different low bit rate video codings typically used in limited-band telecommunication systems. These include for instance ITU-T standards H.263 and H.26L (later possibly H.264), which is currently being standardized. In these systems, the invention is applicable for instance in mobile stations, allowing The following is an exemplary illustration of the invention using the JVT/H.26L video coding as an example. The JVT/H.26L will be described to a detailed level considered satisfactory for understanding the invention and its preferred embodiments. For a more detailed description of the implementation of JVT/H.26L, a reference is made to the document: Joint Video Team (JVT) of ISO/IEC MPEG and ITU-T VCEG, DRAFT ISO/IEC 14496-10:2002 (E) "JVT Working draft 2, Release 7".

Figure 1:
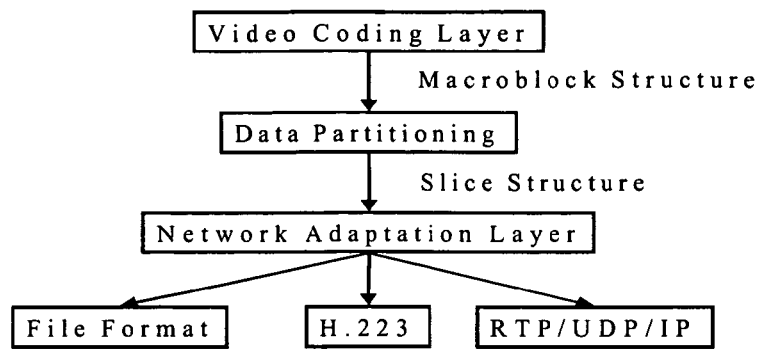
FIG. 1 shows the conceptual structure of the JVT/H.26L design.

The conceptual structure of the JVT/H.26L design will be described referring to FIG. 1. In the JVT/H.26L, a Video Coding Layer (VCL), which provides the core high-compression representation of the video picture content, and a Network Adaptation Layer (NAL), which packages that representation for delivery over a particular type of network, have been conceptually separated.

The main task of the VCL is to code video data in an efficient manner. However, as has been discussed in the foregoing, errors adversely affect efficiently coded data and so some awareness of possible errors is included. The VCL is able to interrupt the predictive coding chain and to take measures to compensate for the occurrence and propagation of errors. There are several ways in which this can be done: interrupting the temporal prediction chain by introducing INTRA-frames and INTRA-MBs; interrupting spatial error propagation by introducing a slice concept; and introducing a variable length code which can be decoded independently, for example without adaptive arithmetic coding over frames.

The output of VCL is a stream of coded macroblocks where each macroblock appears as a unitary piece of data. Data Partitioning Layer (DPL) re-arranges the symbols in such a way that all symbols of one data type (e.g. DC coefficients, macroblock headers, motion vectors) that belong to a single slice are collected in one coded bit-stream. Symbols having approximately equal subjective and/or syntactical importance in decoding are grouped into one partition.

NAL provides the ability to customize the format of the VCL or DPL data for delivery over a variety of networks. The NAL design can either receive data partitions or slices from the Video Coding and Data Partition Layers depending on the chosen network-adaptation strategy. Data partitioning allows transmission of subjectively and syntactically more important data separately from less important data. Decoders may be unable to decode the less important data without reception of the more important data. Means to protect the more important data better than the less important data can be applied while transmitting the bit-stream over an error-prone network.

The output of the NAL can then be inserted into different transport formats. The video data can be stored in file format for future scanning. It can be encapsulated according to ITU-T H.223 multiplexing format as well. As regards the RTP transport format, the RTP transport stream does not include picture layer or picture headers at all. Instead, data that has conventionally belonged to picture and sequence layer are primarily transmitted out of band. A number of combinations of such data can be transmitted, and each transmitted combination is called a parameter set and enumerated. A parameter set in use is then identified in the transmitted slice header.

Next, encoding of a gradual decoder refresh period according to a preferred embodiment will be explained. The encoder starts the operation by deciding the first frame of a decoder refresh period according to external signals, such as configuration parameters in a standalone encoder or intra update request in a real-time video communication system. The encoder may also analyse the contents of the uncompressed pictures and decide to code a gradual decoder refresh as a response to a masked scene transition, for example.

The encoder decides the length of the gradual decoder refresh period based on external indications, such as configuration parameters in a standalone encoder, or on internal deduction as a response to a masked scene transition, for example. The encoder may also adjust the expected length of the scene transition during the coding of transition based on rate control needs, for example.

A term "reliable region" is used to indicate the area of a picture that is correctly reconstructed when the decoding is started from the beginning of the gradual decoder refresh period. The reliable region preferably consists of macroblocks that are adjacent to each other. Each picture in the gradual decoder refresh period has its own reliable region. Each macroblock residing in the reliable region in one picture belongs to the reliable region in the subsequent stored pictures (in coding order) of the gradual decoder refresh period. Thus, the reliable region at least stays the same or preferably grows from picture to picture (in coding order).

The shape of the reliable region should not be limited by any other constraint than the macroblocks should adjacent to each other. For the coding/decoding purposes, the simplest form of a reliable region is a solid rectangle of macroblocks. According to a preferred embodiment, the reliable region is a solid rectangle of macroblocks that is expanded with an incomplete one-macroblock-wide/tall column/row of macroblocks along one of the four sides of the rectangle.

According to another preferred embodiment, the reliable region is an arbitrary but solid area of macroblocks. According to yet another preferred embodiment, a reliable region is a hollow rectangle of macroblocks with one rectangular hole, which can be used in box-in type of gradual decoder refresh. According to a further preferred embodiment, a reliable region is a hollow rectangle of macroblocks with a hole defined similarly to the reliable region of the preferred implementation of the invention. Reliable regions can even reside mutually inside each other such that, for instance, two reliable regions are grown in a spiral motion.

Accordingly, the definition of hollow reliable regions can be generalized so that there is more than one hole in the region.

The invention can also be generalized so that there is more than one reliable region in one picture. In this case, any reliable region can be used to predict a block in a reliable region of a subsequent frame. Moreover, the refresh periods can be overlapped so that reliable regions of different periods are nested in the pictures within the overlapping period. A reliable region may also change place or shrink from one coded picture to the next one. Such behaviour may be reasonable due to global motion, like camera panorama, or rate control, for example.

A gradual decoder refresh pattern defines clearly in which order the macroblocks are added to the reliable region. For example, in a wipe-down, the macroblocks could be inserted to the reliable region in raster scan order. The encoder decides the type of the gradual decoder refresh pattern. There may be pre-defined default patterns specified in the coding specification/standard and known both in the encoder and in the decoder in advance. There may also be such refresh patterns that are signalled from the encoder to the decoder as a part of coded video bit stream. The encoder signals the selected refresh type to the decoder. Signalling can be done either as in-band signalling or out-band signalling.

Figure 2:
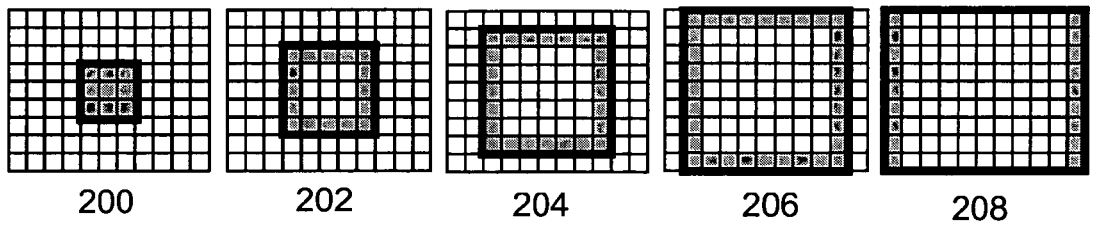
FIG. 2 shows a preferred embodiment of a growing reliable region.

An embodiment of a growing reliable region can be illustrated by referring to FIG. 2. In FIG. 2, the small rectangles indicate macroblocks, and the 9×11 block of small rectangles represent a picture frame 200-208. Thick macroblock edges surround the reliable region in each frame. Mid-gray macroblocks indicate the growth of the reliable region. The picture frames 200-208 are shown in temporal order.

The frame 200 includes a reliable region of 3×3 macroblocks. In the next frame 202, the reliable region is expanded along all four sides of the previous region, resulting in a reliable region of 5×5 macroblocks. The similar procedure, which can be called a box-out refresh pattern, will be applied in following frames 204-208. In the frame 208, the reliable region is expanded to cover the whole frame area, i.e. all macroblocks of the frame. Thick edges, which denote the spatial borders of reliable regions, are preferably macroblock borders.

The encoder decides the number of macroblocks to be added to the reliable region in the current frame to be coded. The decision can be based on pre-defined refresh rate or it can be adjusted according to prevailing network conditions, for example. The chosen number of macroblocks is primarily selected according to the gradual decoder refresh pattern. The macroblocks inserted into the first reliable region of the first frame of gradual decoder refresh period are intra-coded.

According to a preferred embodiment, as a compromise of flexibility and complexity, the evolution of the shape of an reliable region can be limited such that at the beginning, an reliable region is a solid rectangle of macroblock(s). The region can be expanded by inserting macroblocks in definite order along one of the four sides of the rectangle. Once the reliable region becomes a rectangle again, another side of the rectangle can be picked as the subject for macroblock insertion. The expansion rate may be of zero macroblocks as well.

For the subsequent frames of the gradual decoder refresh period, the encoder proceeds as follows: The newly chosen macroblocks are inserted into the reliable region of the current frame. The macroblocks in the reliable region are coded using macroblock mode selection and motion compensation procedure. However, in the motion compensation procedure the motion vector search range is limited so that a motion vector can only refer to pixels that are within a reliable region in an earlier frame in the gradual decoder refresh period.

The reconstruction of reliable region must not depend on reconstructed pixel values falling outside the reliable region. Consequently, this results in some coding constraints. For example, loop filtering and fractional pixel interpolation from pixel values outside the reliable region must be disabled. Breaking such coding dependencies can be signalled in the coded data, and a similar operation can then be done when decoding the data. For example, a boundary where loop filtering must be turned off can be signalled in coded data. Alternatively, the encoder can avoid generating such coded data that refers to unreliable regions. For example, motion vectors can be restricted so that no pixels in unreliable regions are used in motion interpolation.

If there are several at least partly simultaneous reliable regions during a refresh period, the macroblocks inserted into the first reliable region of the first frame of gradual decoder refresh period are intra-coded. Then the subsequent reliable regions can refer to the macroblocks of another reliable regions such that they can be inter-coded, if necessary. Due to reference picture selection, the temporal order of reliable regions referring to each other is not limited. However, the similar coding constraints, as regards to loop filtering and fractional pixel interpolation from pixel values outside the reliable region, as stated above, also apply when referring to another reliable region.

Additionally, the encoding and decoding scan order of macroblocks is preferably changed so that the reliable region is coded/decoded first in raster scan order. After that, the remaining macroblocks not included in the reliable region are coded/decoded in raster scan order. The boundaries of the reliable region are treated as slice boundaries. Consequently, no in-slice prediction can happen across the boundaries of the reliable region.

It is also possible to apply a coding method, wherein a reliable region is defined but not all of aforementioned coding constraints are applied. In this method, macroblocks of an entire picture are coded in normal order (i.e., in raster scan order if no scattered slices or similar coding techniques are in use). Consequently, the coded data of reliable and leftover regions (i.e. macroblocks not belonging to reliable region) are interleaved with each other. Moreover, some of the coded parameters of the reliable region of a picture are dependent on the coded parameters of the leftover region. Examples of such coded parameters include motion vectors close to the border of the reliable region. These motion vectors are predicted from the neighbouring motion vectors in the leftover region. However, the coding constraints regarding loop filtering and fractional pixel interpolation from pixel values outside the reliable region still apply. The method can be called an IREG-D method, wherein IREG stands for isolated region and D indicates the dependency between some of the coded parameters of the isolated region and the leftover region.

Consequently, the coding method of a reliable region disclosed above, wherein all the coding constraints are applied, can be called an IREG-I coding technique. In the IREG-I method, the macroblocks of the reliable region are coded first and the rest of the macroblocks are coded after that. Consequently, the reliable region forms a separable part of coded data from the coded data of the leftover region. The letter I of the abbreviation IREG-I indicates the independency of the coding parameters between the isolated region and the leftover region. The method can preferably be applied by using a so-called sub-picture. The preferred embodiment of applying sub-picture will be described later more in detail.

Next, the decoding procedure according to a preferred embodiment will be described. It is to be noted that the decoding procedure of a video sequence is independent of the encoding procedure. Thus, for the decoding purposes it is only required that the video sequence to be decoded includes certain properties characterised by the invention. The decodable video sequence is thus not limited by the above-described encoding method.

When the decoder receives a parameter set signalled with the video sequence, the decoder checks whether it indicates the use of reliable regions. If the signalled parameter set indicates the use of IREG-I, the decoder starts the decoding of a new picture or continues the decoding of the current picture.

If decoding of a new picture is started, the decoder checks if a new reliable region is established. When a new reliable region is established, the previous shape, size, and location of the reliable regions are reset. When the decoding of a new picture is started, the shape, size, and location of the reliable regions are updated according to the received parameters.

Once the shape, size, and location of the reliable regions are up to date, the macroblock address of the first macroblock of the slice identifies which reliable region the slice belongs to or if the slice belongs to the leftover region. The reliable regions of a picture are decoded first.

Loop filtering of each macroblock is limited such that the neighbouring macroblock are checked whether they belong to a different region (i.e. one belongs to the reliable region and the other belongs to the leftover region, or they belong to different reliable regions). If any of the neighbouring macroblocks belongs to a different region, then the corresponding macroblock border is filtered as if it were on the picture boundary. Furthermore, intra prediction from areas outside the reliable region being decoded is advantageously not applied.

If the signalled parameter set indicates the use of IREG-D, the decoder decodes a slice the same way as in the case of IREG-I, which was described above, except for the macroblock location decision. The spatial macroblock order is normal, and a slice may contain macroblocks from many reliable regions and from the leftover region at the same time. A major difference is that intra prediction and motion vector prediction may happen across region boundaries. However, the coding constraints regarding loop filtering and fractional pixel interpolation from pixel values outside the reliable region still apply.

According to a preferred embodiment, the changes required by the aforementioned procedure can be accomplished by adding some new parameters to be signalled in connection with the coded video sequence. The parameters can be signalled before the video scanning session or they can be transmitted or updated during the video scanning session. For instance, the following parameters could be added to the parameter set:

1. Type of Isolated Region (TIR). Identifies whether and which type of isolated regions is in use.

None: No isolated region is used. Thus, the macroblocks are coded according to normal coding.

IREG-D: Normal bitstream order version of isolated regions is used.

IREG-I: Isolated bitstream order version of isolated regions is used.

2. Number of Simultaneous Isolated Regions (NSIR). Signals how many isolated regions exist at the same time within a picture. The value is limited by profile and level. Each initial isolated region is uniquely identified with a running number, starting from 0 or 1, for instance. The identifier is referred to as the IREG ID. For each IREG ID, the following parameters are conveyed:

3. Shape Evolution Type of Isolated Regions. The locations, shapes, and variation order of isolated regions are defined by this parameter. The following values are proposed:

Raster scan: The first macroblock of the isolated region is the top-left one of the picture. The isolated region grows in raster scan order.

Reverse raster scan: The first macroblock of the isolated region is the bottom-right one of the picture. The isolated region grows in reverse raster scan order.

Wipe right: The first macroblock of the isolated region is the top-left one of the picture. The isolated region grows from top to bottom. The next macroblock after the bottom macroblock of a column is the top macroblock of the column on the right side of the previous column.

Wipe left: The first macroblock of the isolated region is the bottom-right one of the picture. The isolated region grows from bottom to top. The next macroblock after the top macroblock of a column is the bottom macroblock of the column on the left side of the previous column.

Box out clockwise: The first macroblock of the isolated region is preferably not restricted. The isolated region grows clockwise around the previously defined isolated region.

Box out counter-clockwise: This is similar to above, but the isolated region grows counter-clockwise.

Pre-defined free-form: This parameter value is accompanied with a list of macroblock numbers that define the location, shape, and growth order of the isolated region. These pre-defined free-forms are preferably communicated to the decoder in forehand during the video scanning session. The macroblocks are numbered in raster scan order starting from the macroblock on the top-left corner of the picture, which has number 0. Notice that the shape of the isolated region has to follow the restrictions given earlier.

Pre-defined static rectangle: This parameter value signals that the isolated region stays the same within the IREG GOP. The value is associated with the top-left corner of the isolated region as well as the width and the height of the isolated region. Also these pre-defined values are preferably communicated to the decoder in forehand during the video scanning session.

Dynamic rectangle: This parameter is present only when IREG-I is in use. This region variation mode is used for sub-picture coding. Note that herein the isolated region in any frame is a rectangle. No location, shape, or growth order of the isolated region is defined in the parameter set, but similar parameters are included in the slice header.

4. Growth Rate of Isolated Region (GRIR). This parameter defines how many macroblocks per each picture are added to the isolated region referred to in the description of the previous parameters. There is also a specific parameter value indicating a varying growth rate. If a varying growth rate is indicated in the parameter set, the actual growth rate per frame is indicated in the slice header.

Constant rate of N (N>=1) macroblocks: The isolated region grows by N macroblocks per each picture.

Pre-defined rate: This parameter value is associated with a set of values $\{a_1, a_2, \ldots, a_N\}$, each defining the number of macroblocks to be added to the isolated region in one picture. N equals to the number of pictures in the IREG period, and $a_1$ is the initial size of the isolated region in macroblocks.

Varying rate: Growth rate indicated by Growth Rate of Isolated Region (GRIR) in slice header.

Figure 3:
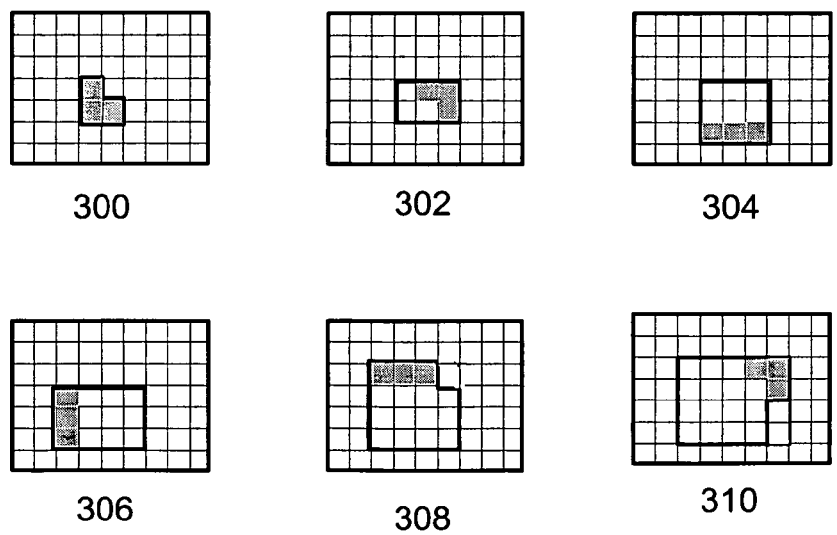
FIG. 3 shows an example procedure of adding macroblocks into a reliable region according to a certain refresh pattern.

An example procedure of inserting macroblocks into a reliable region according to a certain refresh pattern can be illustrated by referring to FIG. 3. FIG. 3 shows the first few picture frames (300-310) of a growing reliable region, which has the shape evolution type defined as "Box out clockwise" and constant growth rate (GRIR) of three macroblocks. The first frame 300 has a L-shaped reliable region (according to "Box out clockwise" shape) consisting of three macroblocks. The next three marcoblocks are added to the reliable region in the next frame 302. The shape evolution type controls the places of new macroblocks, resulting in a reliable region of 3×2 macroblock. The procedure is continued in each frame 304-310 by adding three new macroblocks along the outline of the reliable region in clockwise manner.

As was described earlier, the design of the JVT/H.26L allows the customisation of the video coding layer (VCL) or data partitioning layer (DPL) data format for delivery over a variety of networks. Data partitioning allows transmission of subjectively and syntactically more important data separately from less important data. Decoders may be unable to decode the less important data without reception of the more important data. When using, for example, the RTP transport format, the RTP transport stream does not include picture layer or picture headers at all. Instead, this data, conventionally belonged to picture and sequence layer, are transmitted out of band. A number of combinations of such data can be transmitted, and each transmitted combination is called a parameter set and enumerated. A parameter set in use is then identified in the transmitted slice header.

Therefore, according to a preferred embodiment, the following conditional parameters can be added to the slice header preferably before reference picture selection parameters:

1. Sequence Number of the Isolated Region (SNIR). This parameter is present if the parameter set indicates the use of isolated regions. Value 0 indicates that sequence number (SNIRb) is deduced from the latest transmitted SNIR value SNIRa, the corresponding picture number Pna, and the current picture number PNb as follows: SNIRb=PNb−Pna+ SNIRa, where the arithmetic between picture numbers takes care of possible wrap-overs. Value 1 indicates a start of a new reliable region and is transmitted at least once per each IREG period. Values greater than 0 indicate the sequence number explicitly and can be used to improve error resiliency.

2. Shape Change of Isolated Region (SCIR). This parameter is present if the parameter set indicates a varying growth rate of the isolated region or if the shape evolution type of the isolated region is dynamic rectangle. Value 0 means that the growth rate or the shape, size, and location of the rectangular isolated region are the same as in any other slice of the same picture. Value 1 indicates GRIR and IRIR are the same as in the previous stored and transmitted picture. Value 2 indicates that either GRIR or IRIR follows. GRIR and IRIR are repeated for each isolated region of the picture.

3. Growth Rate of Isolated Region (GRIR). This parameter is present only if the parameter set indicates a varying growth rate of the isolated region. The parameter signals the number of macroblocks added to the isolated region compared to the isolated region of the previous stored frame in coding order.

4. Information about Rectangular Isolated Region (IRIR). This group of parameters is present if the shape evolution type of the isolated region is dynamic rectangle. The following four codewords follow:

Left: The coordinate of the left-most macroblock in the isolated region (in macroblocks). The left-most macroblock column of the picture is assigned value zero.

Top: The coordinate of the top-most macroblock in the isolated region (in macroblocks). The top-most macroblock row of the picture is assigned value zero.

Width: The width of the isolated region. The codewords are assigned as follows:

| Symbol no | UVLC code | Explanation |
| --- | --- | --- |
| 0 | 1 | Guess = (RightMost − Left)/2 + 1, where RightMost is the column address of the right-most macroblock of the picture and / stands for division by truncation. For example, for a QCIF picture and Left equal to 3, Width becomes (10 − 3)/2 + 1 = 4. |
| 1 | 001 | Guess + 1 |
| 2 | 011 | Guess − 1 |
| 3 | 00001 | Guess + 2 |
| 4 | 00011 | Guess − 2 |
| ... | ... | ... |

Height: The height of the sub-picture. The codewords are assigned similarly to Width.

For the more detailed description of JVT video codec parameter sets, a reference is made to ISO/IEC documents "VCEG-N52" and VCEG-N72r1", Next, the decoding procedure according to a preferred embodiment will be described. For the sake of illustration, it is presumed herein that the parameter set signalled with the video sequence (either in-band or out-band) includes at least some of the parameters disclosed above. It is, however, to be noted that the above parameters are merely examples of how the desired properties can be achieved. It is apparent for a man skilled in the art that an implementation reaching the same results can be carried out in numerous ways using different set of parameters.

When the decoder receives a parameter set signalled with the video sequence, the decoder checks whether it indicates the use of reliable regions. If the signalled parameter set indicates the use of IREG-I, the decoder decodes a slice as follows:

If the picture number of the slice to be decoded is different from the picture number of the previously decoded slice, or if the temporal reference of the slice to be decoded is different from the temporal reference of the previously decoded slice, decoding of a new picture is started. Otherwise, decoding of the current picture is continued.

If decoding of a new picture is started, the decoder checks if a new reliable region is established. If any of the reliable-region-related parameters of the parameter set have been changed, the decoder infers the start of a new reliable region. Similarly, if SNIR is 1, the decoder deduces the start of a new reliable region. When a new reliable region is established, the previous shape, size, and location of the reliable regions are reset. If the decoding of a new picture is started, the shape, size, and location of the reliable regions are updated (one reliable region at a time) as follows:

If the shape evolution type of the reliable region is non-rectangular and if the growth rate is constant, the shape, size, and location of the reliable region are calculated as if the constant number of macroblocks were added to the zero-sized reliable region SNIR times.

If the shape evolution type of the reliable region is non-rectangular and if the growth rate is pre-defined, SNIR indicates the number of macroblocks $a_{SNIR}$ to be added to the corresponding reliable region of the previous stored and transmitted picture.

If a pre-defined freeform type of the reliable region is in use but the growth rate is signaled for each picture separately, the shape and size of the reliable region is formed by adding GRIR macroblocks in the pre-defined order to the reliable region of the previous stored and transmitted picture.

If the shape evolution type is pre-defined static rectangle, its size, shape, and location are indicated in the parameter set. If the shape evolution type is dynamic rectangle, the size, shape, and location of the rectangular reliable region is indicated in the slice header. Once the shape, size, and location of the reliable regions are up to date, the macroblock address of the first macroblock of the slice identifies which reliable region the slice belongs to or if the slice belongs to the leftover region. The reliable regions of a picture are decoded first.

Before decoding the coded data of a macroblock, its spatial location is calculated. The spatial macroblock order is normal (either using raster or scattered scan order), but macroblock positions falling outside the currently decoded reliable or leftover region are skipped.

Loop filtering of each macroblock is limited as follows: If the neighbouring macroblock to its left belongs to a different region (i.e. one belongs to the reliable region and the other belongs to the leftover region, or they belong to different reliable regions), then the macroblock is filtered as if it were on the left picture boundary. If its above neighbouring macroblock belongs to a different region, then the macroblock is filtered as if it were at the top macroblock row of the picture.

Furthermore, intra prediction from areas outside the reliable region being decoded is advantageously not applied.

If the signalled parameter set indicates the use of IREG-D, the decoder decodes a slice the same way as in the case of IREG-I, which was described above, except for the macroblock location decision. The spatial macroblock order is normal, and a slice may contain macroblocks from many reliable regions and from the leftover region at the same time. A major difference is that intra prediction and motion vector prediction may happen across region boundaries. However, the coding constraints regarding loop filtering and fractional pixel interpolation from pixel values outside the reliable region still apply.

A preferred embodiment of the IREG-I method may be implemented in connection with a so-called sub-picture, which has been proposed to the JVT/H.26L. A sub-picture can be generated by adding a sub-picture coding layer between picture and slice layers. The sub-picture coding layer forms so-called sub-pictures (SP), which are typically rectangular foreground region SPs (FR SPs), except for the so-called background region (BR) SP. The BR SP consists of the picture area not falling to any of the rectangular SPs. The foreground region SPs of a picture are coded before the background region SP. Macroblocks within a SP are coded in scan-order. The SPs do not overlap, i.e. the entire encoded picture consists of all SPs. According to this embodiment of the invention, a sub-picture can be used as an reliable region. The shape and the size of the sub-picture can be controlled by the aforementioned parameters, for instance.

Figure 4:
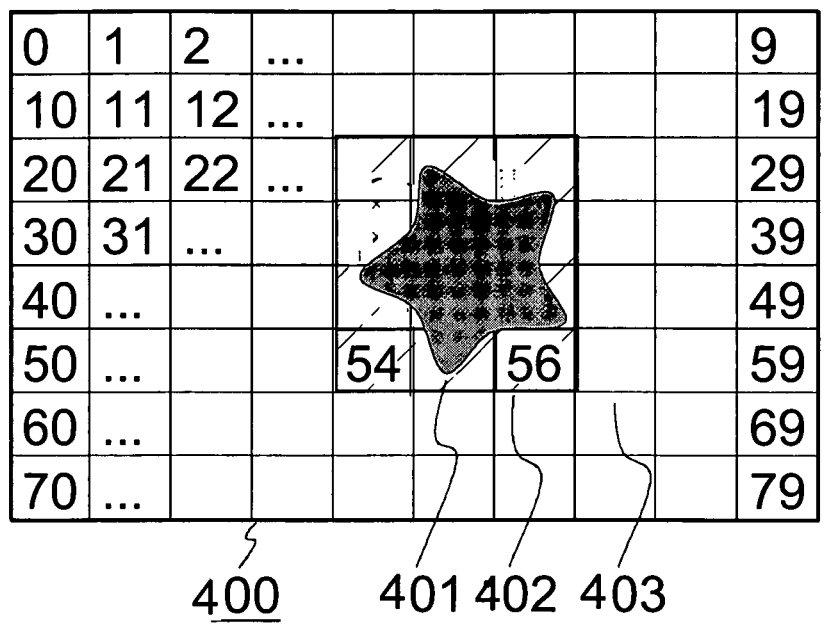
FIG. 4 shows a picture to be encoded in relation to macroblocks defined for video encoding.

FIG. 4 shows a picture 400 to be encoded in relation to macroblocks (MBs) defined for video encoding. The picture comprises an object that is considered as a foreground object. A rectangular foreground region sub-picture (FR SP) 402 has been drawn around the foreground object along the MB borders. Surrounding the foreground object 402, the picture also has a background. The portion of the background that surrounds the FR SP 402 is referred to as the background region sub-picture 404 (BR SP). Notice that also part of the background may belong to the FR SP 402, as is the case here. FIG. 4 also shows the MBs assigned in ascending order numbered as 0 to 79 where the first MB (0) is at the left-hand side upper corner and numbering grows to the right and continues after each row from the left of the next row.

Figure 5:
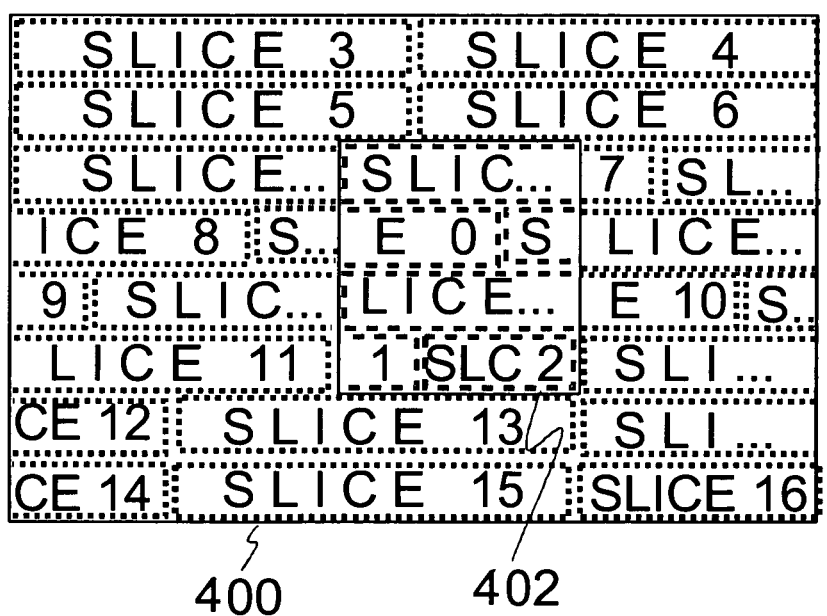
FIG. 5 shows a principal drawing of video coding slices formed for the picture of FIG. 4 according to the sub-picture implementation.

FIG. 5 shows a principal drawing of video coding slices formed for the picture of FIG. 4 according to the sub-picture implementation. The picture is segmented into video coding slices using a slice size of 5 macroblocks. The segmentation is started from the most important FR SP and the BR SP is segmented into slices after all the FR SPs (in FIGS. 4 and 5 only one FR SP is present). The slices are given running slice numbers starting from 0. Notice that slice 0 occupies 3 MBs from the first row within the FR SP and then 2 MBs of the second row within the FR SP, and particularly that the last slice of the FR SP is closed before the BR SP is encoded. The MBs in the BR SP are then segmented into slices in the scan-order so that each slice but the last one is generally composed of the maximum number of MBs allowed for one slice. The slices simply skip over each FR SP. Larger slices generally result in smaller amount of redundancy required to encode a picture.

According to a preferred embodiment, the sub-picture-based gradual decoder refresh method can be implemented such that the reliable region is coded as the foreground sub-picture. Preferably, the independent sub-picture coding mode is used so that loop filtering is turned off across the exterior boundary of the foreground sub-picture. The shape and position of the foreground sub-picture within the whole picture should not be restricted by any other constraints than that the macroblocks belonging to the sub-picture should be adjacent to each other.

In addition to providing random access points for the decoder, the invention can be applied also to improve the error resilience of video transmission. The method disclosed above can be used as an error-aware encoding method with pre-determined intra macroblock update pattern. The number of updated macroblocks per frame algorithms can change according to selected conditions but the order of updated macroblocks remains the same. The method can also be used so that some macroblocks in the reliable region are never updated in intra mode. Accordingly, the technique falls into the category of adaptive intra macroblock update.

The usage of isolated regions for loss aware intra update can be applied in a very straightforward manner such that isolated regions are used continuously from where the first isolated region starts. Since the very first frame of a sequence is entirely intra-coded, the first isolated region starts preferably from the second coded frame. The encoder can select a proper growth rate according to the picture size and the assumed packet loss rate. Generally, a good growth rate (i.e. the refresh rate) is equivalent to the loss rate of macroblocks. For example, if the packet loss rate is 20%, a growth rate of 80 macroblocks is proper.

The coding of reliable regions is performed as disclosed above, but for the leftover regions, the pixels in leftover regions are replicated by the spatially corresponding pixels in the previous reconstructed frame. That is, a macroblock in the leftover region will be coded as if the content keeps unchanged from the previous frame.

In the decoder side, partially updated images during the period can be viewed if this is considered visually pleasing.

The embodiment has the advantages that the end-to-end transmission delay is dropped remarkably compared to intra frame coding. Because of the constant quantization parameter, a stable picture quality can be obtained while keeping low bit-rate fluctuation. A more stable image quality is generally considered less annoying. Moreover, spatio-temporal error concealment can be applied if there are losses.

Many kinds of refresh patterns, such as different kinds of wipes and boxing, can be used. Especially, if a box-out refresh pattern is used, the central picture part will be displayed first. From the region-of-interest point of view, the central part is often more important.

As a result of avoiding intra frames, end-users perceive that the responded pictures are displayed faster after the refresh request. In addition, end-users perceive a shorter drop in picture rate.

The procedure according to above-mentioned embodiments provides several advantages. If compared to conventional encoding of random access points, wherein an intra frame starts an independently decodable group of pictures (GOP), the invention has, inter alia, the benefit that the invention enables updating an predefined picture area reliably without full intra macroblock coverage of the area. The area is updated gradually during many coded pictures. Reliable regions in a previous picture can be used as a motion compensation reference for a reliable region in a subsequent picture. The choice of the macroblock mode for each macroblock in a reliable region can be made using rate-distortion optimisation. Thus, the invention enables coding of a reliable region optimally from rate-distortion point of view.

This property of the invention may be especially useful in sequences, which undergo relatively steady global motion, such as camera pans to any direction. In such a case, an area that was close to a picture border in a first frame moves closer to the middle of the picture in the next frame. If the area in the first frame can be intra-coded and need not be intra-coded again in the next frame.

Furthermore, the instantaneous bit-rate of the coded stream has smoother fluctuations. This helps to avoid buffer overflows, may reduce the needed size of the pre-decoder buffer, and is likely to reduce the end-to-end transmission delay.

For error-prone transmission, a certain number of macroblocks per picture are coded in intra mode anyway. The invention enables reusing these macroblocks for random access purposes, too.

If at least a part of the intra frame is lost or corrupted, the receiving decoder has few means to detect if it should use spatial or spatio-temporal error concealment. A straightforward choice is to use spatial error concealment, as the spatially neighbouring areas were intra-coded. However, spatio-temporal error propagation might have resulted into better concealment result. This phenomenon can be avoided if the method according to the invention is applied, i.e. only a part of the picture is updated in intra mode at a time.

Conversational video applications refer to video telephony, video conferencing, and other similar applications. This family of applications is characterized by the goal to minimize the end-to-end delay. Conversational applications can operate in various networks, such as ISDN (see ITU-T Recommendation H.320), PSTN (ITU-T H.324), fixed IP networks (ITU-T H.323), and packet-switched mobile networks (3GPP TS 26.235). Typically, at least one link in the network has a limited maximum throughput bit-rate. While some networks, such as ISDN, provide a low transmission error rate, others, such as the Internet and mobile networks, are relatively susceptible to transmission errors.

In conversational applications, the aim is to keep the video bit-rate relatively constant due to the target to minimize the end-to-end delay and to the fact of having a fixed maximum throughput. As intra-coding is typically more costly in bit-rate point of view compared to inter-coding, intra-coding of entire an frame at a time should be avoided.

A decoder expects a refresh of the image at the beginning of the sequence and as a response of an intra picture update request. In the method according to the invention, instead of an entire intra picture, a gradual decoder refresh period can be signalled and coded. Partially updated images during the period can be viewed if desired, which may be visually pleasing.

Using gradual decoder refresh instead of entire intra pictures smoothes out fluctuations in bit-rate and reduces the end-to-end transmission delay. End-users perceive that a picture is displayed faster in the initialization of the session. A receiving terminal requests the far-end encoder for an intra picture update if the received picture is too corrupted. In such a case, end-users perceive a shorter drop in picture rate when the invention is used.

Compared to gradual quantization refinement and gradual resolution refinement, the method provides a more stable image quality as a response to intra picture update request, which is generally considered less annoying.

A major advantage of the invention is that it stops completely the spatio-temporal error propagation. This characteristic has not been available earlier in complex coding schemes, such as the JVT design, with reference picture selection, loop filtering, and fractional pixel interpolation.

Thus, the disclosed method can be used as an error-aware encoding method with pre-determined reliable macroblock update pattern. Note that the number of updated macroblocks per frame in the pre-determined pattern algorithms can change according to selected conditions but the order of updated macroblocks remains the same. Consequently, the method has two simultaneous benefits: while stopping error propagation by intra coding, it also provides a possibility for perfect random access.

The method allows transmitting reliable regions with a better error protection than other regions. Thus, the method outperforms conventional coding with an intra update method where this kind of transport prioritisation is not possible. The reliable region can be protected better than the rest of the coded data against transmission errors. In practice, more redundancy, such as forward error coding, can be applied to reliable regions. Alternatively, reliable regions can be sent through a channel that has better quality of service (QoS) guarantees than the channel used for normal video data transmission. In unicast streaming, when a server is requested to start streaming from a gradual random access position, it does not need to transmit non-reliable areas (background sub-pictures) at all.

Many types of video material, such as news, movies trailers, and music videos, contain frequent scene cuts. Sometimes scene cuts are abrupt, but in many cases, transitions, such as fades or wipes, are applied. Coding of a scene transition is often a challenging problem from compression efficiency point of view, because motion compensation may not be a powerful enough method to represent the changes between pictures in the transition.

Scene transitions can be categorised, for example, to abrupt, masked, faded, and hybrid scene transitions. Abrupt transitions are such that there is no transition period and no picture where the contents of the two subsequent scenes are present at the same time. Masked transitions are such that the second scene spatially uncovers from the first scene in gradual manner. All pictures are displayed at full intensity. Coding of a masked scene transition typically involves at least one intra frame. Examples of masked scene transitions include box-in, box-out, wipes, splits, and dissolve. Faded transitions are such that the pictures of the two scenes are laid on top of each other in semi-transparent manner, and the transparency of the pictures at the top gradually changes in the transition period. Examples of faded transitions include a normal cross-fade and fade through (from and to) black. Hybrid scene transitions are a combination of masked and faded transitions.

The method according to the invention also provides benefits when applying to scene transitions, especially to masked scene transitions. Thereby, a transition can be accessed randomly without coding a full intra picture. When sub-picture-based gradual decoder refresh is in use and when a transition is accessed randomly, the coded data of the first scene of the transition need not be transmitted, decoded, and displayed. Furthermore, a masked scene transition can be coded on purpose to obtain less fluctuations in the coded video bit-rate than if abrupt scene changes were used.

The above describes a method of coding gradual decoder refresh random access points into a video sequence. In concrete terms, this is performed in a video encoder, which may be a video encoder known per se. The video encoder used could be for instance a video encoder according to the ITU-T recommendations H.263 or H.26L, which, in accordance with the invention, is arranged to determine a first reliable region that comprises at least one intra-coded coding block, and to encode said first reliable region in said video sequence such that creation of an information dependency between said first reliable region and coding blocks outside said first reliable region is prevented.

Correspondingly, decoding takes place in a video encoder, which may be a video decoder known per se. The video decoder used could be for instance a low bit rate video decoder according to the ITU-T recommendations H.263 or H.26L, which, in accordance with the invention, is arranged to receive information that determines a first reliable region of the video sequence, the reliable region comprising at least one intra-coded coding block, and to decode said first reliable region from said video sequence such that creation of an information dependency between said first reliable region and coding blocks outside said first reliable region is prevented.

The different parts of video-based telecommunication systems, particularly terminals, may comprise properties to enable bi-directional transfer of multimedia files, i.e. transfer and reception of files. This allows the encoder and decoder to be implemented as a video codec comprising the functionalities of both an encoder and a decoder.

It is to be noted that the functional elements of the invention in the above video encoder, video decoder and terminal can be implemented preferably as software, hardware or a combination of the two. The coding and decoding methods of the invention are particularly well suited to be implemented as computer software comprising computer-readable commands for carrying out the functional steps of the invention. The encoder and decoder can preferably be implemented as a software code stored on storage means and executable by a computer-like device, such as a personal computer (PC) or a mobile station, for achieving the coding/decoding functionalities with said device.

Figure 6:
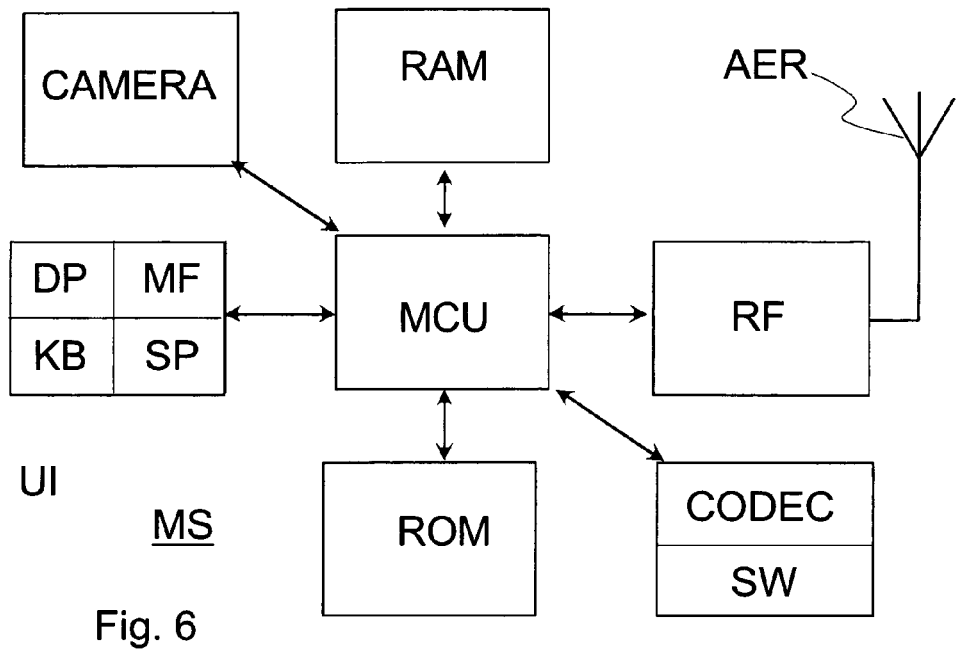
FIG. 6 shows a block diagram of a mobile communication device according to the preferred embodiment of the invention.

FIG. 6 shows a block diagram of a mobile communication device MS according to the preferred embodiment of the invention. In the mobile communication device, a Master Control Unit MCU controls blocks responsible for the mobile communication device's various functions: a Random Access Memory RAM, a Radio Frequency part RF, a Read Only Memory ROM, video codec CODEC and a User Interface UI. The user interface comprises a keyboard KB, a display DP, a speaker SP and a microphone MF. The MCU is a microprocessor, or in alternative embodiments, some other kind of processor, for example a Digital Signal Processor. Advantageously, the operating instructions of the MCU have been stored previously in the ROM memory. In accordance with its instructions (i.e. a computer program), the MCU uses the RF block for transmitting and receiving data over a radio path. The video codec may be either hardware based or fully or partly software based, in which case the CODEC comprises computer programs for controlling the MCU to perform video encoding and decoding functions as required. The MCU uses the RAM as its working memory. The mobile communication device can capture motion video by the video camera, encode and packetise the motion video using the MCU, the RAM and CODEC based software. The RF block is then used exchange encoded video with other parties.

Figure 7:
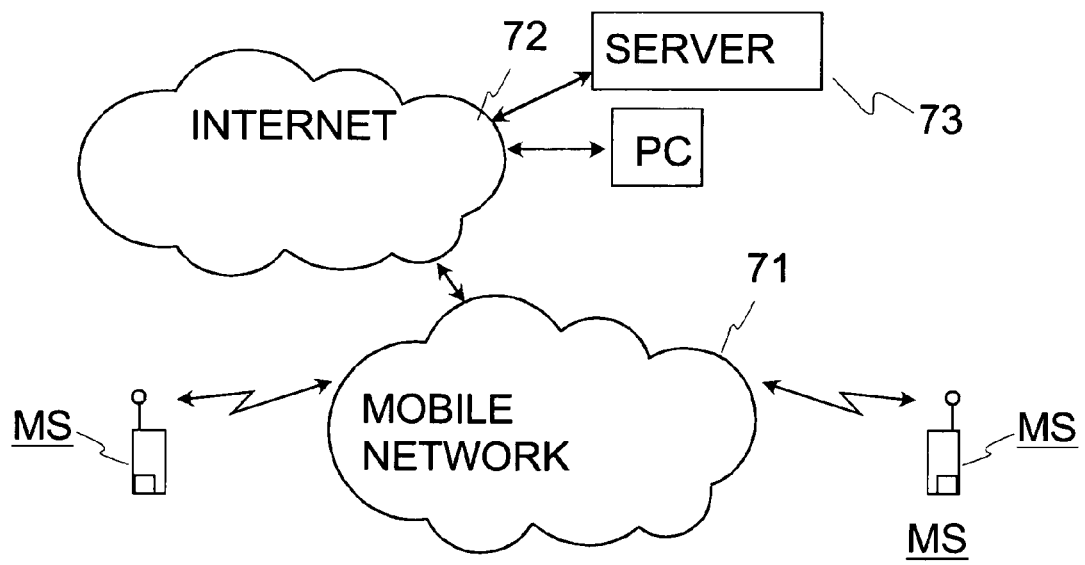
FIG. 7 shows a video communication system, wherein the invention is applicable.

FIG. 7 shows video communication system 70 comprising a plurality of mobile communication devices MS, a mobile telecommunications network 71, the Internet 72, a video server 73 and a fixed PC connected to the Internet. The video server has a video encoder and can provide on-demand video streams such as weather forecasts or news.

The preferred embodiment of the invention is based on a region-based coding scheme.

The invention can also be implemented as a video signal comprising a video sequence, the video sequence being composed of video frames, wherein at least one video frame is divided into a set of coding blocks and at least one of said coding blocks is encoded by intra-coding. The video signal further comprises information that determines a first reliable region of the video sequence, the reliable region comprising at least one intra-coded coding block, and information for decoding said first reliable region from said video sequence such that creation of an information dependency between said first reliable region and coding blocks outside said first reliable region is prevented. The video signal can be a real-time transmitted signal or it can be stored on a computer-readable carrier using a media, like a mass memory or a playback video disk.

It is obvious to a person skilled in the art that as technology advances, the basic idea of the invention can be implemented in a variety of ways. The invention and its embodiments are thus not limited to the above examples, but may vary within the claims.

The invention claimed is:

1. A method for indicating size, shape and location of a region within a digital picture, the picture being divided into a set of blocks, the method comprising:

defining, in an encoder, a value for at least one size parameter being indicative of a number of the blocks within said region, and selecting, in the encoder, a value for at least one shape evolution parameter being indicative of a selection order of the blocks into said region, wherein said at least one size parameter comprises a size change rate parameter (GRIR) and a sequence number parameter of size change (SNIR).

2. The method as claimed in claim 1, further comprising:
encoding said values for said at least one size parameter and said at least one shape evolution parameter into a bitstream of a video sequence in order to indicate size, shape and location of the region within the picture.

3. The method as claimed in claim 1, further comprising:
including said value for the at least one shape evolution parameter in a parameter set of said picture.

4. The method as claimed in claim 1, further comprising:
determining the number of the coding blocks within said region on the basis of at least one of the following: the value for said size change rate parameter, the value for said sequence number parameter of size change.

5. The method as claimed in claim 1, further comprising:
including said value for the size change rate parameter in the parameter set of said picture, and
including said value for the sequence number parameter of size change in a slice header belonging to said region.

6. The method as claimed in claim 1, further comprising:
determining the location of the blocks of the region on the basis of the value for the shape evolution parameter.

7. The method as claimed in claim 1, further comprising:
selecting the value for said at least one shape evolution parameter from at least one of the following: raster scan, reverse raster scan, box-out clockwise, box-out counter-clockwise, wipe left, wipe right.

8. The method as claimed in claim 1, wherein
the region comprises at least one slice, the slice comprising blocks having no essential prediction dependencies across boundaries of the slice,
whereby the blocks are selected into the slice in scanning order inside the region.

9. An encoder for encoding digital pictures into a bitstream, the encoder being arranged to
divide at least one picture into a set of blocks, determine a region within a picture, said region comprising at least one block,
define a value for at least one size parameter being indicative of a number of the blocks within said region,
select a value for at least one shape evolution parameter being indicative of a selection order of the blocks into said region, and
encode said values for at least one size parameter and said at least one shape evolution parameter in said bitstream in order to indicate size, shape and location of the region within the picture, wherein
said at least one size parameter comprises a size change rate parameter (GRIR) and a sequence number parameter of size change (SNIR).

10. The encoder as claimed in claim 9, wherein the encoder is further arranged to
include said value for the at least one shape evolution parameter in a parameter set of said picture.

11. The encoder as claimed in claim 9, wherein the encoder is further arranged to
include said value for the size change rate parameter in the parameter set of said picture, and include said value for the sequence number parameter of size change in a slice header belonging to said region.

12. The encoder as claimed in claim 9, wherein the encoder is further arranged to
select the value for said at least one shape evolution parameter from at least one of the following: raster scan, reverse raster scan, box-out clockwise, box-out counter-clockwise, wipe left, wipe right.

13. The encoder as claimed in claim 9, wherein the region comprises at least one slice, the slice comprising blocks having no essential prediction dependencies across boundaries of the slice,
whereby the encoder is further arranged to select the blocks into the slice in scanning order inside the region.

14. A computer readable medium comprising a computer program product stored thereon and executable in a data processing device, for encoding digital pictures into a bitstream, the computer program product comprising
a computer program code for dividing at least one picture into a set of blocks,
a computer program code for determining a region within a picture, said region comprising at least one block,
a computer program code for defining a value for at least one size parameter being indicative of a number of the blocks within said region,
a computer program code for selecting a value for at least one shape evolution parameter being indicative of a selection order of the blocks into said region, and
a computer program code for encoding said values for at least one size parameter and said at least one shape evolution parameter in said bitstream in order to indicate size, shape and location of the region within the picture, wherein
said at least one size parameter comprises a size change rate parameter (GRIR) and a sequence number parameter of size change (SNIR).

15. A decoder for decoding a bitstream comprising at least one encoded digital picture, said at least one picture being divided into a set of encoded blocks, the decoder being arranged to
decode, from said bitstream, a value for at least one size parameter being indicative of a number of the encoded blocks of a region within the picture and a value for at least one shape evolution parameter being indicative of a selection order of the encoded blocks into said region,
determine size, shape and location of the region within the picture on the basis of the values for said parameters, and
decode the region according to said at least one size, shape and location, wherein
said at least one size parameter comprises a size change rate parameter (GRIR) and a sequence number parameter of size change (SNIR).

16. The decoder as claimed in claim 15, wherein the decoder is arranged to
decode said value for the at least one shape evolution parameter from a picture parameter set of said region.

17. The decoder as claimed in claim 15, wherein the decoder is arranged to
determine the number of the coding blocks within said region on the basis of at least one of the following: the value for said size change rate parameter, the value for said sequence number parameter of size change.

18. The decoder as claimed in claim 15, wherein the decoder is arranged to
decode the value for said size change rate parameter from the parameter set of said picture, and
decode the value for said sequence number parameter of size change from a slice header belonging to said region.

19. The decoder as claimed in claim 15, wherein the decoder is arranged to
determine the location of the blocks of the region on the basis of the value for the shape evolution parameter.

20. The decoder as claimed in claim 15, wherein the value for said at least one shape evolution parameter is at least one of the following: raster scan, reverse raster scan, box-out clockwise, box-out counter-clockwise, wipe left, wipe right.

21. The decoder as claimed in claim 15, wherein
the region comprising at least one slice, the slice comprising blocks having no essential prediction dependencies across boundaries of the slice,
whereby the decoder is arranged to decode the blocks into the slice in scanning order inside the region.

22. A computer readable medium comprising a computer program product stored thereon and executable in a data processing device, for decoding a bitstream comprising at least one encoded digital picture, said at least one picture being divided into a set of encoded blocks, the computer program product comprising:
a computer program code for decoding, from said bitstream, a value for at least one size parameter being indicative of a number of the encoded blocks of a region within the picture and a value for at least one shape evolution parameter being indicative of a selection order of the encoded blocks into said region,
a computer program code for determining size, shape and location of the region within the picture on the basis of the values for said parameters, and
a computer program code for decoding the region according said at least one size, shape and location, wherein
said at least one size parameter comprises a size change rate parameter (GRIR) and a sequence number parameter of size change (SNIR).

23. A video signal comprising a bitstream comprising at least one encoded digital picture, said at least one picture being divided into a set of encoded blocks, the video signal further comprising:
at least one size parameter value being indicative of a number of the encoded blocks of a region within the picture; and
at least one shape evolution parameter value being indicative of a selection order of the encoded blocks into said region, said parameters enabling to determine size, shape and location of the region within the picture, wherein
said at least one size parameter comprises a size change rate parameter (GRIR) and a sequence number parameter of size change (SNIR).

* * * * *